(12) United States Patent
Walston et al.

(10) Patent No.: US 7,735,863 B2
(45) Date of Patent: Jun. 15, 2010

(54) EJECTION MITIGATION PANEL

(75) Inventors: Bryan Walston, Brigham City, UT (US);
Kurt Gammill, Layton, UT (US); James E. Nelson, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 328 days.

(21) Appl. No.: 11/593,281

(22) Filed: Nov. 6, 2006

(65) Prior Publication Data
US 2008/0106072 A1    May 8, 2008

(51) Int. Cl.
*B60R 21/08* (2006.01)
*B60R 21/213* (2006.01)
*B60R 21/18* (2006.01)

(52) U.S. Cl. .................. 280/749; 280/730.2; 280/743.2

(58) Field of Classification Search ............ 280/728.1, 280/749, 730.2, 728.2, 743.1, 743.2
See application file for complete search history.

(56) References Cited

U.S. PATENT DOCUMENTS

| 3,687,485 | A  | * | 8/1972  | Campbell ............... 280/733 |
| 5,322,322 | A  | * | 6/1994  | Bark et al. ............. 280/730.2 |
| 5,480,181 | A  | * | 1/1996  | Bark et al. ............. 280/730.2 |
| 6,095,551 | A  | * | 8/2000  | O'Docherty ........... 280/730.2 |
| 6,152,481 | A  | * | 11/2000 | Webber et al. .......... 280/730.2 |
| 6,224,091 | B1 | * | 5/2001  | Eyrainer et al. ........ 280/730.2 |
| 6,505,853 | B2 | * | 1/2003  | Brannon et al. ........ 280/730.2 |
| 6,517,110 | B1 | * | 2/2003  | Butters et al. ............ 280/749 |
| 6,676,154 | B2 | * | 1/2004  | Fischer ................... 280/729 |
| 6,695,341 | B2 | * | 2/2004  | Winarto et al. ......... 280/730.2 |
| 6,695,342 | B2 |   | 2/2004  | Tanase et al. ........... 280/730.2 |
| 6,709,008 | B2 |   | 3/2004  | McGee et al. ............. 280/729 |
| 6,773,031 | B2 | * | 8/2004  | Haig ........................ 280/749 |
| 6,793,239 | B2 | * | 9/2004  | Feldman et al. ........... 280/729 |
| 7,125,069 | B2 | * | 10/2006 | Cacucci et al. ......... 296/190.03 |
| 7,261,316 | B1 | * | 8/2007  | Salmo et al. ........... 280/730.2 |
| 7,628,421 | B2 | * | 12/2009 | Wright .................. 280/730.2 |
| 2001/0033073 | A1 | * | 10/2001 | Hammond et al. ....... 280/730.2 |
| 2005/0082797 | A1 |   | 4/2005  | Welford et al. .......... 280/730.2 |
| 2007/0052212 | A1 | * | 3/2007  | Powals ..................... 280/729 |
| 2008/0106072 | A1 |   | 5/2008  | Walston et al. |
| 2008/0106083 | A1 |   | 5/2008  | Walston |

FOREIGN PATENT DOCUMENTS

EP    1 264 742    2/2005

OTHER PUBLICATIONS

Notification of Transmittal of the International Search Report and the Written Opinion of the International Searching Authority issued Sep. 24, 2008 in International Application No. PCT/US2007/082189.
Office Action issued Jan. 21, 2009 in co-pending U.S. Appl. No. 11/593,230.
Amendment and Response to Office Action filed Jul. 21, 2009 in co-pending U.S. Appl. No. 11/593,230.

* cited by examiner

*Primary Examiner*—Paul N Dickson
*Assistant Examiner*—Karen Jane J Amores
(74) *Attorney, Agent, or Firm*—Sally J Brown; Stoel Rives, LLP

(57) ABSTRACT

An ejection mitigation system for use in a motor vehicle including one or more inflatable airbags and at least one ejection mitigation panel which is not integral with an inflatable airbag and wherein the ejection mitigation panel is attached to at least one point below the belt line of the motor vehicle.

16 Claims, 4 Drawing Sheets

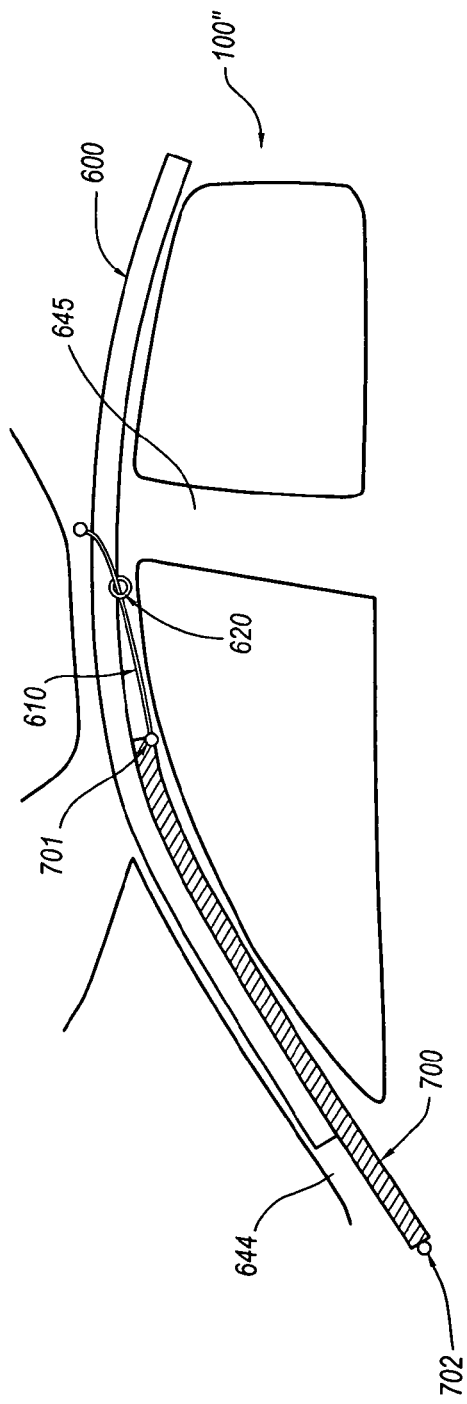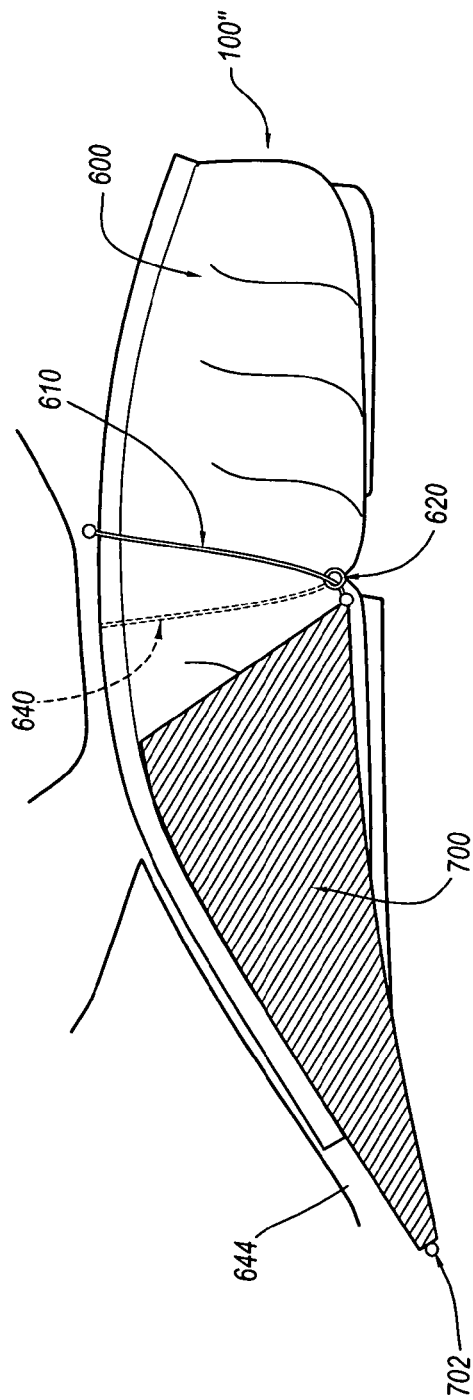
FIG. 4A
FIG. 4B

EJECTION MITIGATION PANEL

TECHNICAL FIELD

The present disclosure relates generally to the field of automotive protective systems. More specifically, the present disclosure relates to ejection mitigation for passenger airbag systems.

BRIEF DESCRIPTION OF THE DRAWINGS

Understanding that drawings depict only typical embodiments of the invention and are not therefore to be considered to be limiting of its scope, the invention will be described and explained with specificity and detail through the use of the accompanying drawings as listed below.

FIG. 4A is a is a side view of yet another embodiment of an ejection mitigation system in a stored state mounted inside a vehicle.

FIG. 4B is a side view of the ejection mitigation system as shown in FIG. 4A in a deployed state.

Figure 1:
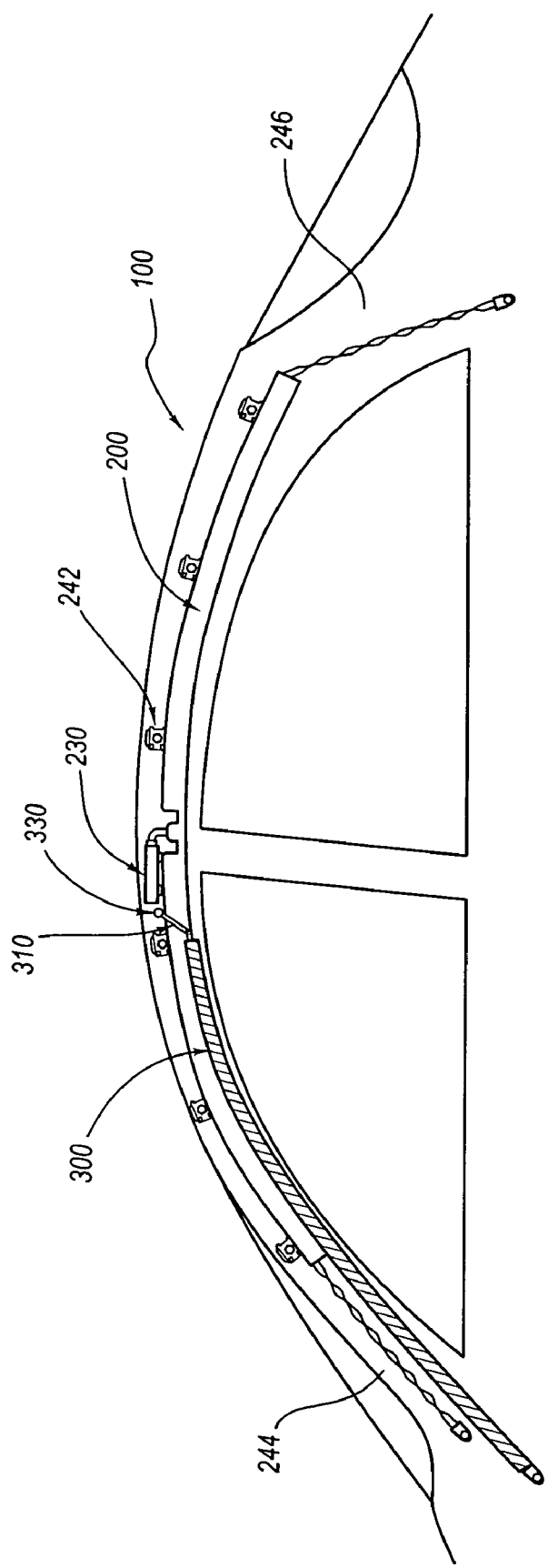
FIG. 1 is a side view from of one embodiment of an ejection mitigation system in a stored state mounted inside a motor vehicle.

INDEX OF ELEMENTS IDENTIFIED IN THE DRAWINGS 100 vehicle
110 window
100' vehicle
100" vehicle
200 inflatable airbag
230 inflator
242 attachment clips
244 A-pillar
246 C-pillar
250 inflatable zone
300 ejection mitigation panel
310 tether
330 tether attachment point
400 ejection mitigation panel
401 attachment point
402 ejection mitigation panel attachment point
410 tether
430 tether attachment point
444 A-pillar
446 B-pillar
500 inflatable airbag
600 inflatable side curtain
610 tether
620 cinch ring
644 A-pillar
645 B-pillar
700 tethered ejection mitigation panel
702 ejection mitigation panel attachment point

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the invention, as claimed, but is merely representative of various embodiments. While the various aspects of the embodiments are presented in drawings, the drawings are not necessarily drawn to scale unless specifically indicated.

As those of skill in the art will appreciate, the principles of the invention may be applied to and used with a variety of airbag deployment systems including frontal driver and passenger airbags, knee airbags, overhead airbags, curtain airbags, and the like. Thus, the present invention is applicable to airbag cushions of various shapes and sizes.

With reference now to the accompanying figures, particular embodiments will now be described in greater detail. Referring to FIG. 1, an ejection mitigation system for use in a motor vehicle may include at least one inflatable airbag 200, shown in an undeployed state disposed within a motor vehicle 100. The inflatable airbag 200 may be mounted on or near a roof rail inside the vehicle 100. The inflatable airbag 200 may also include an inflator 230 that may contain a stored quantity of pressurized inflation fluid or a combination of pressurized inflation fluid and ignitable material for heating the inflation fluid. Alternatively, the inflator 230 may be a pyrotechnic inflator that uses the combustion of gas-generating material to generate the inflation gas.

The inflatable airbag 200 may be mounted to the vehicle 100 by attachment clips 242. The inflatable airbag 200 may extend from the A-pillar 244 to the C-pillar 246 in the vehicle 100. In alternative embodiments, the inflatable airbag 200 may extend from the A-pillar 244 to a D-pillar in larger A-D vehicles such as vans and large sport utility vehicles.

Figure 2:
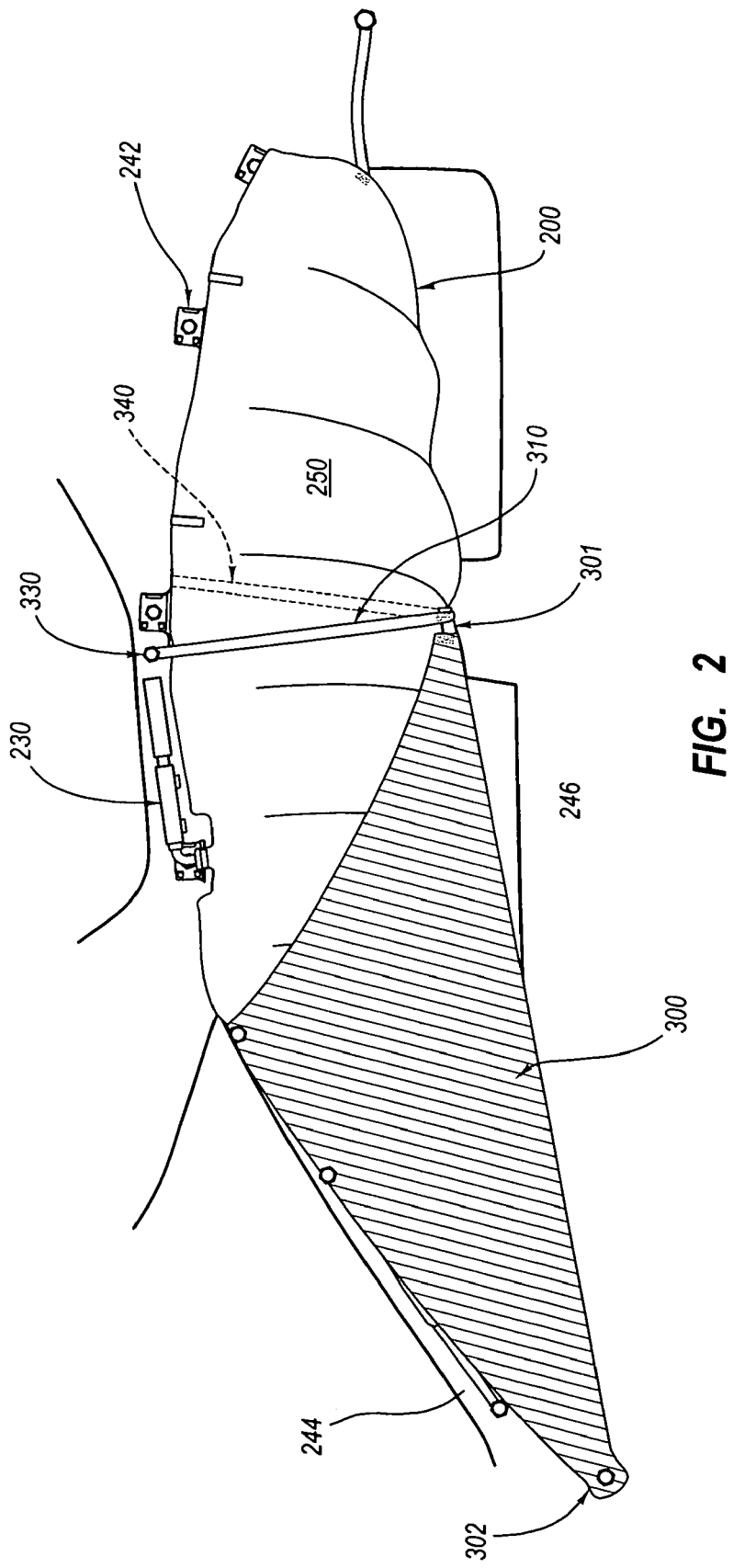
FIG. 2 is a side view of one embodiment of an ejection mitigation system in a fully deployed state.

With continued reference to FIG. 1, the inflatable airbag 200 can be associated with an ejection mitigation panel ("EJM") 300 attached to a tether 310. The tether 310 may be attached to the EJM 300 at or near one end and attached at or near the other end to the inflatable airbag 200 or the inside of the vehicle 100 at the tether attachment point 330. As shown in FIG. 2, the tether 310 may also be slidingly connected to a guide strap 340 at the attachment point 301. For example, the end of tether 310 may be slidingly looped around the guide strap 340 in such a manner that the looped-end of the tether 310 would slide along the length of the guide strap 340. The guide strap 340 may be attached to the inboard or outboard side of the inflatable airbag 200. For example, in the undeployed state, as shown in FIG. 1, the guide strap 340 can be rolled or folded up with the inflatable airbag 200 in such a way to allow the looped-end of the tether 310 to slidingly attach to the top of the guide strap 340. In this way, as the inflatable airbag 200 is deployed, as shown in FIG. 2, the force of the inflation will slide the tether 310 along the guide strap 340 and simultaneously tighten the tether 310 while pulling on the attached EJM 300 until it is substantially deployed.

In yet another embodiment, the tether 310 may be attached to the EJM 300 at or near a first end, loosely strung under the inflatable airbag 200, and then attached to the roof rail of the vehicle 100 under the inflatable airbag 200 (not shown). More particularly, in the undeployed state, the tether 310 can be attached to the EJM 300 and loosely strung under the rolled inflatable airbag 200 so that when the inflatable airbag 200 is inflated the downward movement of inflatable airbag 200 will take the slack out of the tether 310 and tighten the tether 310 thereby pulling on the EJM 300 until it is fully deployed.

As shown in FIG. 2, the inflatable airbag 200 may have an inflatable zone 250 that provides impact protection for vehicle passengers. However, the motor vehicle may have window openings that are not completely covered by the inflatable zone 250. The EJM 300 can be configured to cover the window openings that are not covered by the inflatable airbag 200 in order to keep the passenger's limbs, head, and body within the vehicle and to avoid the increased costs and complexity of bigger inflatable airbags, larger inflators, and increased packaging space.

In one embodiment, the EJM 300 may be constructed of a woven fabric such as a nylon fabric, or a non-woven sheet such as a plastic sheet. In an alternative embodiment, as shown in FIG. 3, the EJM 300 may be constructed of netting, webbing, mesh, or other textile materials.

Figure 3:
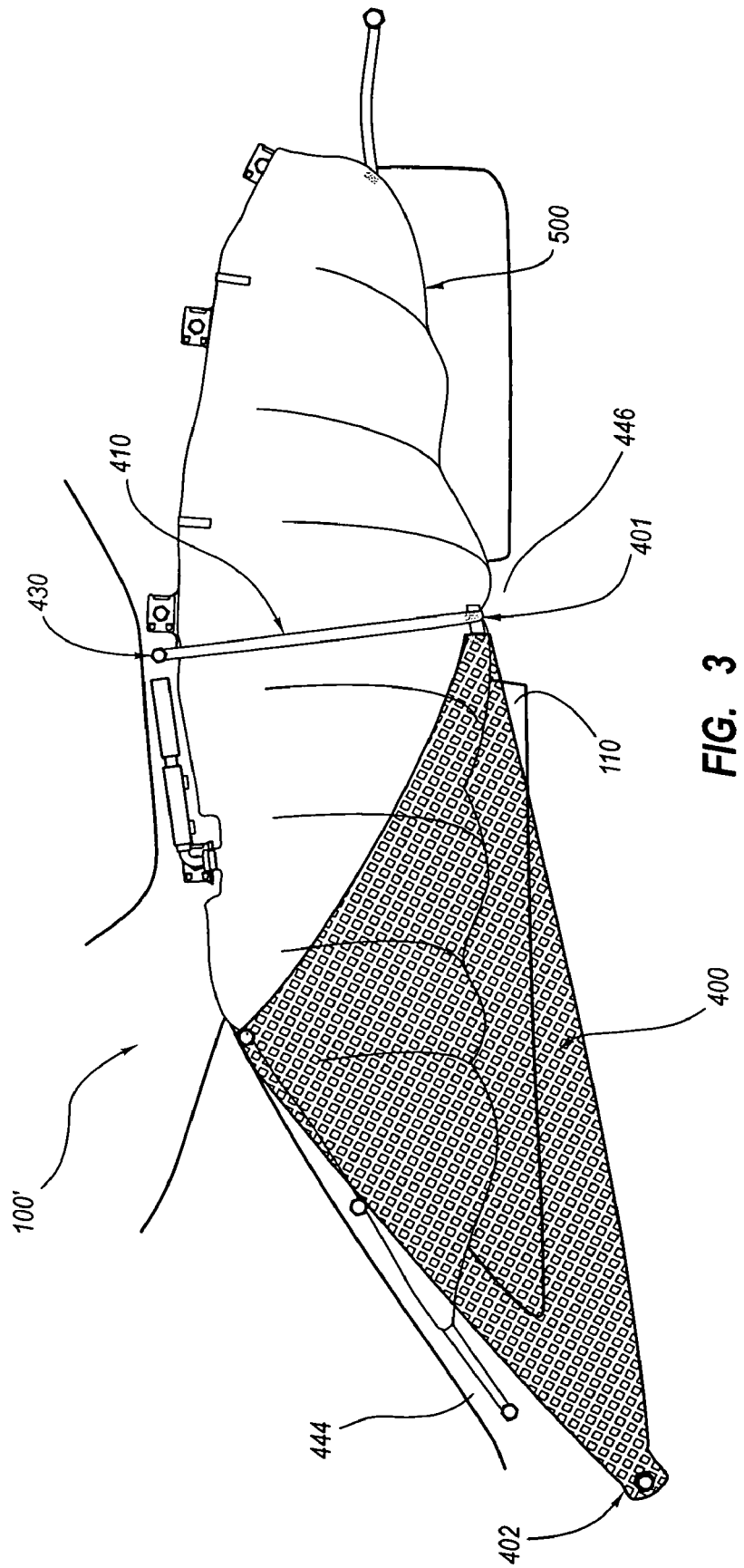
FIG. 3 is a side view of an ejection mitigation system in a fully deployed state mounted inside a motor vehicle.

In another embodiment as shown by FIG. 3, an ejection mitigation panel 400 ("EJM 400") may be attached to the roof rail beginning at a high point along the A-pillar 444 of a motor vehicle 100' and extended down the A-pillar 444 to the attachment point 402. The EJM 400 may be attached to a tether 410 that is attached at a first and second end to the tether attachment point 430. The tether 410 may be looped from the front of the inflatable airbag 500 to the back of the inflatable airbag 500. For example, the EJM 400 may be attached to the middle of the tether 410 at attachment point 401. In the undeployed state, the tether 410 may include a substantial amount of slack stored along the roof rail to allow the inflation of the inflatable airbag 500 when deployed. In this way the tether 410 encircles the airbag 500 with enough slack to allow the full inflation of the inflatable airbag 500 while simultaneously pulling on the EJM 400 until it is fully deployed.

More specifically, in the undeployed state, the tether 410 is attached at approximately the middle of the tether 410 to the EJM 400 and loosely looped under the inflatable airbag 500 with both ends of the tether 410 being attached at point 430. Upon inflation of the inflatable airbag 500, the downward motion of the inflatable airbag 500 as it unrolls or unfolds tightens the tether 410 thus removing the slack from tether 410 and pulling on the EJM 400 until it is fully deployed and it stretches across the lower areas of the window 110 thereby covering the front corner of the window 110 and preventing ejection of the passenger's limbs, head, and body.

The attachment point 402 may be located below the belt line of the vehicle in order to position the EJM 400 to entirely cover the front corner of the window 110 and provide improved ejection mitigation. For example, the EJM 400 may be attached to the attachment point 402 located low on the A-pillar 444. In one embodiment, the attachment point 402 may be located approximately adjacent the A-pillar 444 and below the instrument panel of the motor vehicle 100'. From the attachment point 402, the EJM 400 may be deployed towards the B-pillar 446 so that the bottom edge of EJM 400 remains adjacent to or below the belt line of the vehicle.

With continued reference to FIG. 3, the EJM 400 may serve to prevent an inflatable airbag from swinging out a vehicle window. In the event of a collision or rollover accident the window 110 may be compromised and allow an inflatable airbag to protrude from the window 110. However, as shown in FIG. 3, the EJM 400 may be tethered by tether 410 and pulled tight across the bottom edges of window 110 and adjacent to the B-pillar 446; thereby the tether 410 and the bottom edge of the EJM 400 may prevent both the EJM 400 and the inflatable airbag 500 from escaping out the window 110.

In another embodiment shown in FIGS. 4A-4B, a tethered ejection mitigation panel ("EJM") 700 may deployed by the activation of an inflatable side curtain 600. With particular reference to FIG. 4A, the inflatable side curtain 600 in the undeployed state may be stored in the roof rail of the vehicle 100" and extend from approximately adjacent to the A-pillar 644 to at least the B-pillar 645 and may even extend beyond to a C-pillar or a D-pillar in larger vehicles. As shown in FIG. 4B, the inflatable side curtain 600 may include a guide strap 640 (shown in phantom) that is threaded through a cinch ring 620 and attached to the back, or outboard side of the inflatable side curtain 600 in such a way that may allow the cinch ring 620 to slide along the length of the guide strap 640. A cinch ring as disclosed herein may be formed out of metal, plastic, fabric or other suitable material and configured like a round ring or any other shape or configuration that will function as described herein. The inflatable side curtain 600 may also include a tether 610 that is threaded through the cinch ring 620 and attached to the EJM 700 at the tether attachment point 701. As shown in FIG. 4A, the attachment off the EJM 700 at the ejection mitigation panel attachment point 702 is located below the belt line at the front corner of the window opening of vehicle 100". For example, the attachment point 702 may be below the beltline of the motor vehicle, adjacent the A-pillar and the instrument panel.

In yet another embodiment as shown by FIGS. 4A-4B, the guide strap 640 may be attached to the inflatable side curtain 600 at a location at or adjacent to the B-pillar 645; thus, localizing the cinch ring 620 at or adjacent to the top of the B-pillar when the inflatable side curtain 600 is in the undeployed state. When the inflatable side curtain 600 is deployed it pulls the cinch ring 620 to the bottom of the inflatable side curtain 600 while simultaneously tightening the tether 610 through the cinch ring 620 so that the slack in the tether 610 is taken up and the EJM 700 is deployed. In this way, the EJM 700 is unfolded by the tether 610 and positioned over the corner of the window that is not covered by the inflatable side curtain 600. Additional examples of deploying an ejection mitigation panel may be found in U.S. application Ser. No. 11/593,230 (published as U.S. Patent Application Publication No. 2008/0106083), titled CINCH RING FOR TIGHTENING TETHERS OF AN INFLATABLE AIRBAG, which was filed on Nov. 6, 2006.

The EJM 700 may be a separate non-inflatable panel that is not directly attached to the inflatable side curtain 600. FIG. 4A shows that the cinch ring 620 is visible outside of the folded inflatable side curtain 600. It is also contemplated that the cinch ring 620 may be attached directly to the bottom edge of the inflatable side curtain 600 such that when the inflatable side curtain 600 is folded and stored the cinch ring 620 remains accessible by the tether 610. In yet another embodiment, the inflatable side curtain 600 may include a guide strap 640 that is attached to the front, or inboard side of the inflatable side curtain 600, that may allow a cinch ring 630 to slide along the guide strap 640.

Various embodiments for ejection mitigation systems have been disclosed herein. The ejection mitigation panels, not integral with an inflatable airbag and configured to cover the areas of the window not covered by inflatable airbags and deployed by the inflation of the inflatable airbags, are examples of means for ejection mitigation and keeping a passenger's limbs, head, and body within the vehicle. Various embodiments for deploying ejection mitigation systems have also been disclosed herein. The tethers slidingly attached to a guide strap on an inflatable airbag that may be used for deploying an ejection mitigation panel are examples of means for deploying an ejection mitigation system. Likewise, the tether looped under the inflatable airbag and attached to an ejection mitigation panel is an example of means for deploying and ejection mitigation system. Furthermore, the cinch rings and the tethers that may be used for tightening tethers attached to an ejection mitigation panel are examples of means for deploying an ejection mitigation system.

Without further elaboration, it is believed that one skilled in the art can use the preceding description to utilize the present disclosure to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. § 112 ¶6. The scope of the invention is therefore defined by the following claims.

The invention claimed is:

1. An ejection mitigation system for use in a motor vehicle comprising:
    at least one inflatable airbag;
    at least one ejection mitigation panel which is not integral with the at least one inflatable airbag, wherein the at least one ejection mitigation panel is attached to at least one point below a belt line of the motor vehicle;
    at least one tether attached to the ejection mitigation panel, wherein the tether is looped around the airbag; and
    wherein the ejection mitigation panel is indirectly deployed by the inflation of the at least one inflatable airbag.

2. The ejection mitigation system of claim 1, wherein the at least one ejection mitigation panel is configured to cover a window opening on a side structure of the motor vehicle not covered by the at least one inflatable airbag.

3. The ejection mitigation system of claim 1, wherein the at least one inflatable airbag is an automobile side curtain airbag.

4. The ejection mitigation device of claim 1, wherein the ejection mitigation panel is a triangular shaped panel with one edge mounted adjacent the A-pillar of the motor vehicle.

5. The ejection mitigation device of claim 1, wherein the ejection mitigation panel is perforated.

6. The ejection mitigation device of claim 1, wherein the ejection mitigation panel is attached to a first point below the beltline of the motor vehicle adjacent to the A-pillar.

7. The ejection mitigation device of claim 1, wherein the ejection mitigation panel is attached adjacent to the A-pillar and below the level of the instrument panel of the motor vehicle.

8. The ejection mitigation device of claim 1, wherein the ejection mitigation panel is attached to the motor vehicle at a second point above the lower edge of the at least one inflatable air bag when in the inflated state.

9. An ejection mitigation system for use in a motor vehicle comprising:
    at least one inflatable airbag;
    at least one guide strap attached to the inflatable air bag;
    at least one ejection mitigation panel which is not integral with the at least one inflatable airbag, wherein the at least one ejection mitigation panel is attached to at least one point below a belt line of the motor vehicle;
    at least one tether attached to the ejection mitigation panel at one end and slidingly attached to the at least one guide strap at the other end, wherein the tether and guide strap are looped around the airbag; and
    wherein the ejection mitigation panel is indirectly deployed by the inflation of the at least one inflatable airbag.

10. The ejection mitigation system of claim 9, wherein the at least one ejection mitigation panel is configured to cover a window opening of the motor vehicle not covered by the at least one inflatable airbag.

11. The ejection mitigation device of claim 9, wherein the ejection mitigation panel is perforated fabric, netting, webbing or mesh fabric.

12. The ejection mitigation device of claim 9, wherein the ejection mitigation panel is attached to at least one point below the level of the instrument panel of the motor vehicle.

13. The ejection mitigation device of claim 9, wherein the ejection mitigation panel is attached to the motor vehicle at a second point above the lower edge of the at least one inflatable air bag when in the inflated state.

14. An ejection mitigation panel which is not integral to an inflatable airbag of a motor vehicle and configured to cover a window opening inside the motor vehicle not covered by a deployed inflatable airbag, the ejection mitigation panel comprising:
    a panel of material configured to be attached to at least one point below a belt line of the motor vehicle wherein the panel of material is attached to a deployment tether, wherein the tether is looped around the airbag and wherein the panel of material is indirectly deployed by the inflation of the inflatable airbag.

15. The ejection mitigation panel of claim 14, wherein the panel of material comprises a woven fabric.

16. The ejection mitigation panel of claim 14, wherein the panel of material comprises a non-woven fabric.

* * * * *